(12) United States Patent
Kesselman

(10) Patent No.: US 6,833,515 B1
(45) Date of Patent: Dec. 21, 2004

(54) HANDHELD ELECTRONIC SCALE

(76) Inventor: Joshua D. Kesselman, 2515 S. W. Marine Drive, Vancouver, BC (CA), V6P 6C3

( * ) Notice: Subject to any disclaimer, the term of this patent is extended or adjusted under 35 U.S.C. 154(b) by 111 days.

(21) Appl. No.: 10/284,852

(22) Filed: Oct. 31, 2002

Related U.S. Application Data

(60) Provisional application No. 60/342,013, filed on Dec. 19, 2001.

(51) Int. Cl.[7] ............................................. G01G 21/00
(52) U.S. Cl. ...................... 177/126; 177/127; 177/238; 177/262
(58) Field of Search ............................. 177/126, 127, 177/180, 238–244, 262

(56) References Cited

U.S. PATENT DOCUMENTS

| | | | | |
|---|---|---|---|---|
| 192,207 A | * | 6/1877 | Whyler ........................ 177/262 |
| 1,080,398 A | * | 12/1913 | Wright ......................... 177/262 |
| 4,034,818 A | | 7/1977 | Matilainen ................ 177/25.15 |
| 4,041,289 A | | 8/1977 | Brosh et al. ................. 702/173 |
| 4,120,371 A | * | 10/1978 | Zohn et al. .................. 177/262 |
| 4,195,348 A | | 3/1980 | Kakutani ..................... 702/164 |
| 4,495,581 A | | 1/1985 | Piccione ...................... 702/402 |
| 4,602,693 A | * | 7/1986 | Racicot ........................ 177/262 |
| 4,800,973 A | | 1/1989 | Angel ........................... 177/211 |
| 4,862,979 A | * | 9/1989 | Borchard ..................... 177/181 |
| 4,921,058 A | * | 5/1990 | Pally et al. .................. 177/181 |
| 5,195,599 A | * | 3/1993 | Salini .......................... 177/189 |
| 5,583,322 A | * | 12/1996 | Leisinger et al. ............ 177/180 |
| 6,037,548 A | * | 3/2000 | Baitz et al. ............... 177/25.13 |
| 6,107,576 A | * | 8/2000 | Morton et al. .............. 174/101 |
| 6,177,929 B1 | | 1/2001 | Maddalozzo, Jr. et al. . 345/762 |
| 6,295,198 B1 | | 9/2001 | Loh et al. .................... 361/683 |
| 6,381,484 B1 | | 4/2002 | Ayanruoh .................... 600/407 |
| 6,509,534 B1 | * | 1/2003 | Thadani ....................... 177/126 |
| 6,531,665 B2 | * | 3/2003 | Gietenbruch et al. ........ 177/126 |
| 6,600,110 B1 | * | 7/2003 | Thadani et al. ............. 177/126 |
| 2004/0035614 A1 | * | 2/2004 | Zhang .......................... 177/180 |

* cited by examiner

*Primary Examiner*—Randy W. Gibson
(74) *Attorney, Agent, or Firm*—Christine Q. McLeod; Beusse Brownlee Wolter Mora & Maire

(57) ABSTRACT

The present invention relates to compact portable electronic scale having a scale lid mechanism which pivots the lid of the scale in a predetermined controlled manner between a closed position, where the lid overlays the weighing platform, and an open position, where the lid is pivoted towards the rear of the scale. The pivot mechanism positions the lid such that neither the lid nor the hinge interferes with weighing of oversized objects. Further, the scale includes a removable weighing tray to assist in weighing loose or oversized objects.

1 Claim, 5 Drawing Sheets

PRIOR ART

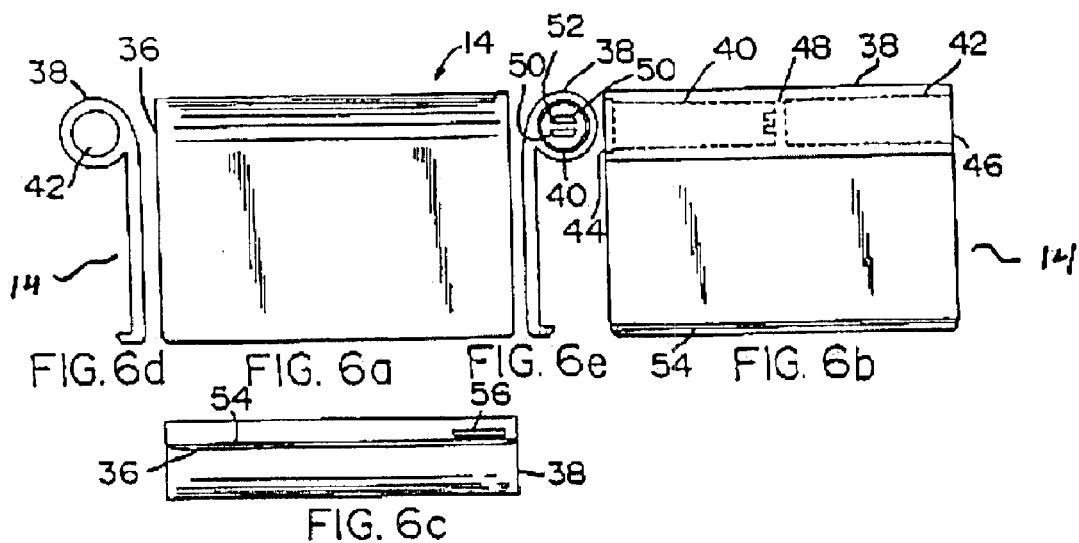
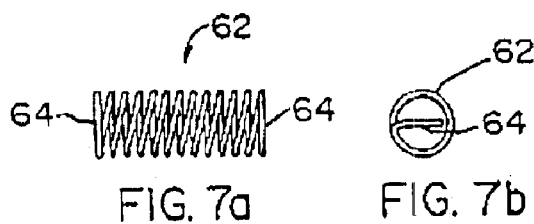
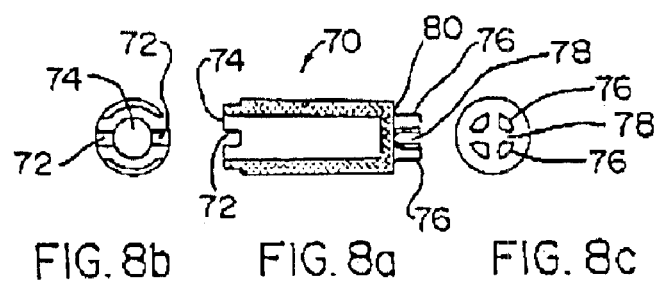

HANDHELD ELECTRONIC SCALE

CROSS-REFERENCE TO RELATED APPLICATIONS

This application claims the benefit of U.S. patent application Ser. No. 60/342,013 filed on Dec. 19, 2001, incorporated herein by reference.

FIELD OF THE INVENTION

The present invention relates to electronic scales. More specifically, this invention relates to a handheld electronic scale having a unique hinge operation and removable weighing tray.

BACKGROUND ART

There are a number of patents for scales including U.S. Pat. Nos. 4,034,818; 4,041,289; 4,195,348; 4,495,581; 4,800,973; 6,177,929; 6,295,198; and 6,381,484, incorporated herein by reference.

Typically, with an electronic scale, an object is positioned on a weighing platform, so that the weight of the object causes the weighing platform to move downward. The downward force causes the weighing platform to exert a force or pressure on a transducer. The transducer converts the downward force into an analog signal in terms of a voltage or a current having a magnitude which varies according to the weight of the object.

Compact portable scales have a number of disadvantages. One disadvantage of compact portable scales is the small weighing platform; making it difficult to weigh objects and loose items. Another disadvantage for compact portable scales having a hinged lid is that the hinge and/or lid interferes with the weighing process, especially when oversized objects are to be weighed.

BRIEF SUMMARY OF THE INVENTION

The hand-held scale of the present invention comprises a portable electronic weighing device having: (a) a housing comprising a base and a lid, the base connected to the lid with a hinge, wherein the hinge operates to pivot the lid relative to the base between a closed position covering a weighing platform and an open position exposing the weighing platform, wherein the lid is rearwardly positioned relative to the weighing platform, and wherein the hinge includes damping means to effectuate controlled pivotal motion between the open and closed positions; (b) a removable tray having an underside fitted to sit on the weighing platform, wherein the underside of the removable weighing tray comprises a flanged edge sized to extend around the edge of the weighing platform, and an upper surface providing a larger surface area than the weighing platform, wherein the upper surface of the weighing tray is cupped for holding the object to be weighed; (c) weighing circuitry in the base in communication with the platform for weighing objects to provide weight data thereof; and (d) a display located on a front surface of the base for digital display of weight data of the object. The housing includes a pair of flanges extending from opposite side edges of the housing in parallel spaced relationship and hinge forming trunnions being formed on inwardly facing surfaces of the flanges. The hinge comprises a tubular portion formed along one edge of the lid extending between the trunnions, the tubular portion including cylindrical bores extending along the longitudinal axis thereof and the damping means arranged in one of the bores. The weighing circuitry comprises a transducer coupled to the platform responsive to the weight of the object to provide an analog signal indicative of the weight, and comprising analog to digital conversion circuitry for providing the weight data. The damping means comprises a helical coil spring. In an embodiment, the portable electronic weighing device further includes a spring-biased latch mounted in the housing for engaging the lid to maintain the lid in a closed position over the weighing platform, the latch being manually operable to release the lid.

All patents, patent applications and publications referred to or cited herein, or from which a claim for benefit of priority has been made, are incorporated by reference in their entirety to the extent they are not inconsistent with the explicit teachings of this specification, including: U.S. Pat. No. 4,041,289 to Brosh et al., U.S. Pat. No. 6,085,384 to Bivens, and U.S. Pat. No.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 6a–6e depict, respectively, front rear, bottom, and end views of the scale cover and hinge structure for containing the lid mechanism.

FIGS. 7a–7b depict, respectively, side and end views of a torsional spring utilized in the lid mechanism.

FIGS. 8a–8c depict, respectively, a longitudinal sectional view and end views of the damping drum utilized in the lid mechanism.

DETAILED DISCLOSURE OF THE INVENTION

Figure 1:
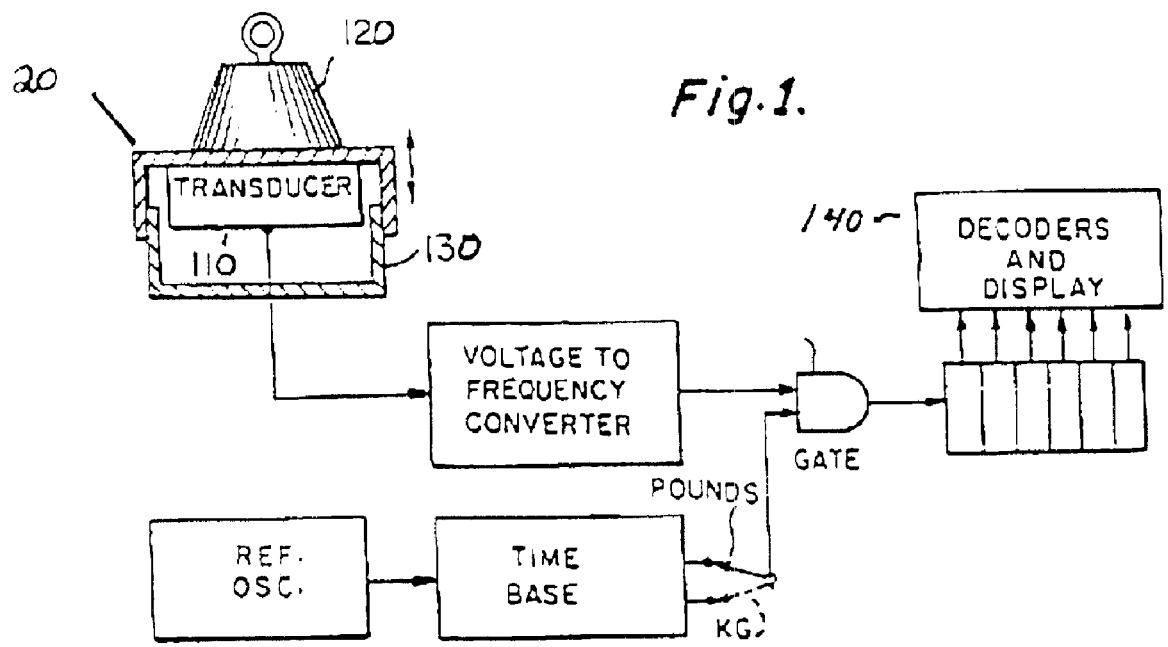
FIG. 1 depicts a block diagram of a sample digital scale.
Figure 2:
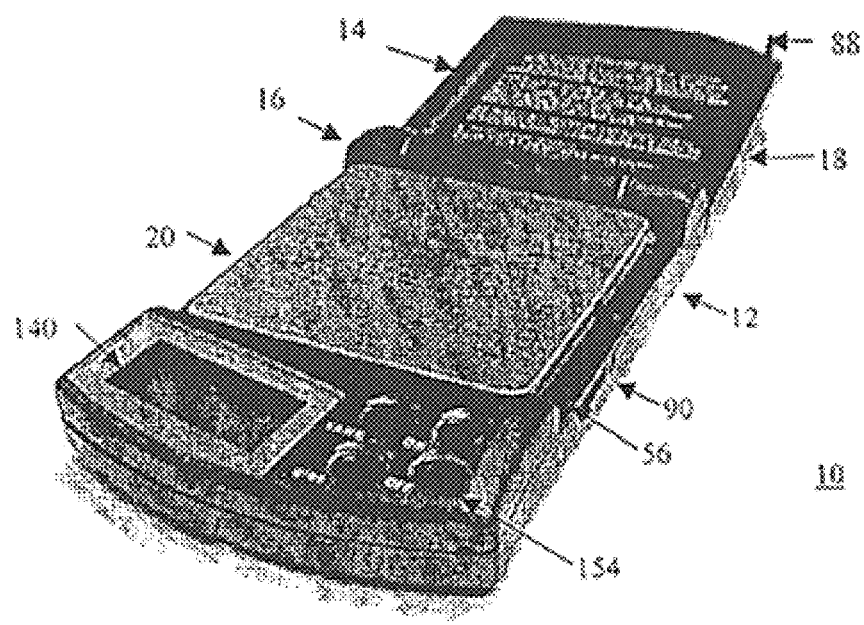
FIG. 2 depicts a perspective view of the scale of the present invention in the open position.

Referring now to the drawings, embodiments of the present invention will be described. FIG. 1 depicts a simplified block diagram of a scale apparatus according to this invention. Here is shown an object 120 positioned on a weighing platform 20. The weighing platform 20 is associated with a base member 130, which is positioned on a horizontal reference plane. An object 120 causes the weighing platform 20 to move downwardly with respect to the plane or base 130. The weighing platform 20 and base member 130 are conventional scale components and many examples of suitable apparatus exist in the prior art.

As is conventional, the weighing platform 20 responds by moving downwardly according to the weight of the object 120 to exert a force or pressure on a transducer 110 coupled between the weighing platform 20 and the base 130.

The transducer 110 or load cell can be a number of different devices for converting a pressure or a force into an electrical signal. As such, the transducer 110 may compromise a Wheatstone bridge configuration employing piezoresistive elements or other pressure converting devices to provide a varying electrical signal indicative of the weight of the object 120 on the weighing platform 20. As such, the transducer 110 supplies an analog signal in terms of a voltage or a current having a magnitude which varies according to the weight of the object 120. The weight of the object 120 is displayed on the digital display 140. Where the weight of the object 120 can be selectively 150 displayed in grams, ounces, or other known units of measuring weights.

As can be ascertained from FIGS. 2 to 5, the portable, hand-held scale 10 includes a housing 12 which is of a generally rectangular, relatively flat box-like structure. The Figures illustrate a lid structure 14 hingedly articulated to housing 12 and incorporating a lid mechanism 16 and possessing a flat, plate-shaped cover portion 18 represented in its closed and latched position over scale weighing platform 20.

The lid structure 14 as illustrated in detail in the drawing FIGS. 6(a)–6(e) essentially comprises a generally rectangular flat plate portion 36 having an upper edge which curves rearwardly so as to extend into a tubular portion 38, which is adapted to form a hinge construction for articulated connection of the lid structure 14 with the trunnion-like projections 28,30 on the housing flanges 24, 26.

The tubular portion 38 is provided with cylindrical blind bores 40,42 which extend coaxially towards each other from the opposite ends 44,46 of the tubular portion, and are separated by means of a wall 48 forming the bottoms of the blind bores 40, 42.

One of the cylindrical blind bores 40 includes at its bottom a pair of parallel spaced upstanding ribs 50 defining a linear spacing 52 therebetween, the function of which is described more specifically hereinbelow.

The opposite edge 54 of the flat plate portion 36 of the lid structure 14 includes a narrow upstanding flange 54 having an elongated aperture 56 formed therein towards one end thereof, which aperture is adapted to be engaged by the latch element 58 of a switch device 60, as described hereinbelow.

Insertable into the blind bore 40 which contains at its bottom the projecting ribs 50 forming the spacing 52 therebetween, is a helical coil spring 62, which is preferably constituted of a spring steel, and which is represented in FIGS. 7(a) and 7(b), with both ends of the spring 62, having the end portions 64 thereof extending transversely across the center of the diameter of the spring so as to form straight and essentially rigid rod-like elements.

As shown in specific detail in FIGS. 8(a)–8(c), a damping drum 70, which is of a hollow cylindrical construction having a recess 72 cut in at one open end 74 thereof, and spaced protrusions 76 defining spaces 78 therebetween at the opposite closed end 80, is adapted to be inserted into the blind bore 40 so as to, in conjunction with the helical coil spring 62 form the lid mechanism 16 for effectuating the pivoting movement of the lid structure 14 relative to the housing 12. The assembly of the components of the lid mechanism 16 into the blind bore 40 so as to effectively facilitate the controlled damped pivoting of the lid structure comprises inserting the helical coil spring 62 into the blind bore 40 having the spaced ribs 50 therein, such that the leading end portion 64 of the spring, which extends across the diameter thereof, is clampingly engaged in the spacing 52 between the two ribs 50 at the bottom of the blind bore 40, which will prevent rotation of that end of the spring 62 relative to the bore 40 and resultingly the lid structure 14.

The other end of the spring 62 which, similarly, possesses a transverse end piece extending across the diameter thereof, is clampingly engaged in the space 78 between the protrusions 76 at the closed end 80 of the damping drum 70, which is of a length so as to axially compress the spring 62 when fully inserted into the blind bore 40. Thus, the spring 62 and the damping drum 70 have their interconnected ends secured against relative rotation.

The lid structure 14 containing the spring 62 and damping drum 70 in the bore 40 and the external cylindrical surface of the damping drum 70, wherein the surface of the bore 40 in that region may be roughened, serrated or ridged so as to prevent outward leakage of the damping grease 84, is positioned between the trunnion projections 28, 30 on the flange elements 24, 26 of the housing. This causes the slot or recess 72 formed in the open end of the damping drum 70 to engage over the rib 34 formed in the trunnion which is adjacent thereto. This will prevent relative rotation between the drum 70 within bore 40 relative to the lid structure 14.

The closing of the lid structure 14 causes the elongate aperture 56 in flange 54 to be engaged by a projecting ledge or tab 88 of a slideable switch element 90 of the switch in the form of a plate member having a projection 92 extending through a slot 94 in the front housing portion, and which is adapted to be finger-actuated in opposition to the biasing latching force of a spring 96 which is retained in the housing 12. Thus, upon pulling the switch element 90, the tab 88 disengages from the aperture 56 and releases the lid structure 14.

Figure 5:
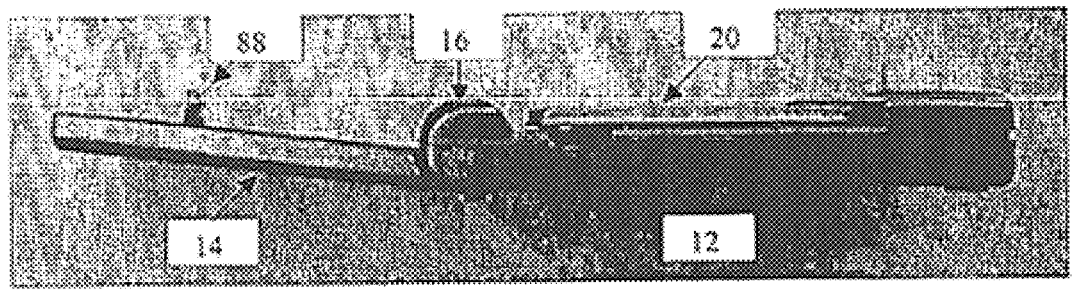
FIG. 5 depicts a side view of the scale of the present invention in the open position.

Inasmuch as the helical coil spring 62 in the bore 40 has been previously torsionally pre-stressed, the release of the switch element 90 by pressing the latter downwardly against the force of the biasing spring element 96 in the housing 12, imparts a torsional or rotational unwinding force to the coil spring 62, so as to forcibly cause the lid structure 14 to pivot or rotate rearwardly into position as shown in FIG. 5.

The rate of movement or speed in the rearward pivoting of the lid structure 14 upon the release thereof is controlled by means of the damping drum 70 and the damping grease 84 arranged thereabout in contact with the inner surface of the blind bore 40 which, in essence, forms a damping cylinder. This structure will slow down and counteract any tendency for rapid pivoting movement of the lid structure 14 which could conceivably cause the scale to bounce and possibly damage the delicate internal components or electronics thereof. As indicated, the damping grease 84 may be a highly viscous oil or grease, or any similar suitable damping material which will not readily leak from the open end of the blind bore 40 forming the damping cylinder.

Figure 3:
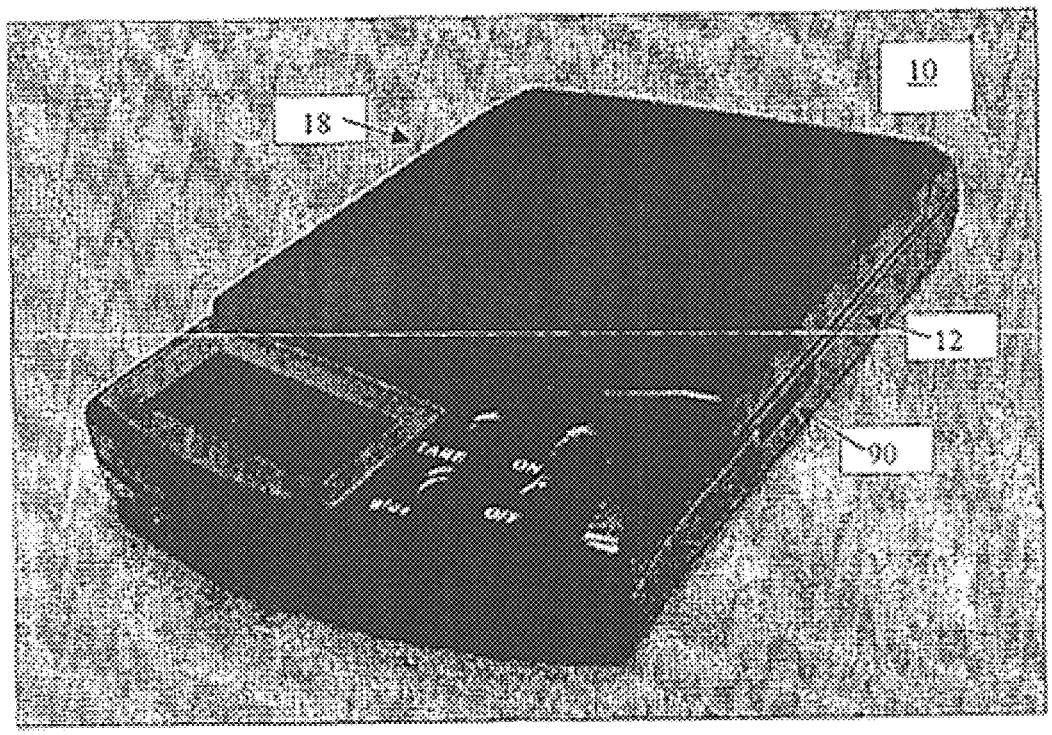
FIG. 3 depicts a perspective view of the scale of the present invention in the closed position.
Figure 4:
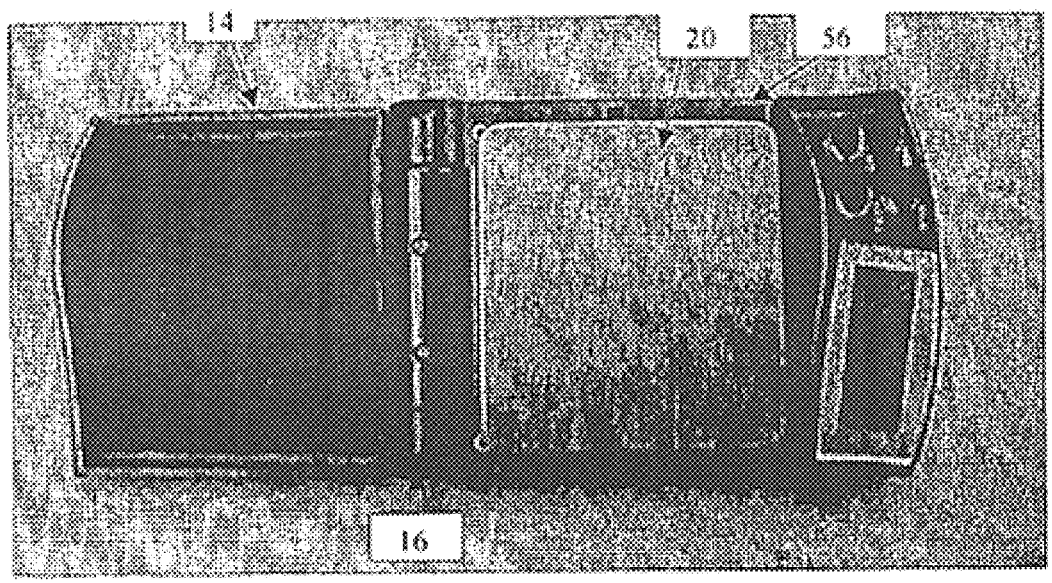
FIG. 4 depicts a top view of the scale of the present invention in the open position.

In order to close the scale, it is merely necessary to position the cover plate portion 36 over the scale weigh platform 20 by manually pivoting the lid structure 14 forwardly about the hinge-forming trunnion elements or projections 28, 30 until such time as the tab 88 of the switch element 98 engages into the aperture 56 of the cover and retains the lid structure 14 in its latched and closed position, as shown in FIG. 3, releasing the cover portion and enabling the lid mechanism 16 to implement the previously described damped and controlled pivoting motion into position.

Figure 9A:
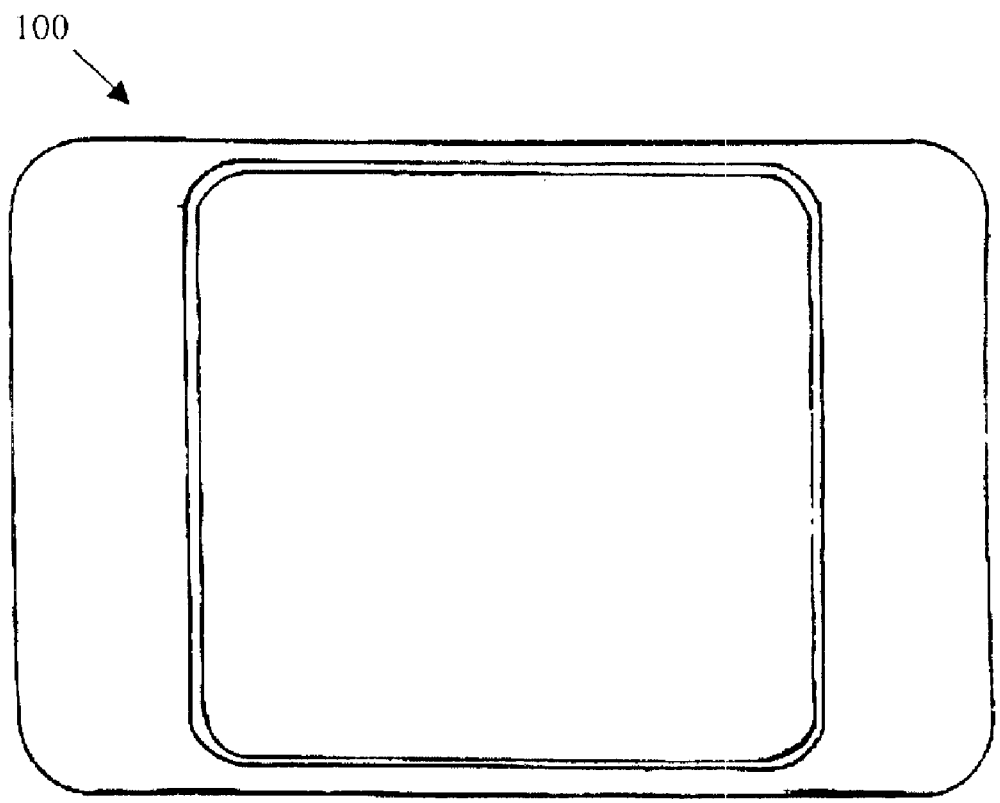
FIGS. 9a–9b depict, respectively, a top and side view of the weighting tray.
Figure 9B:
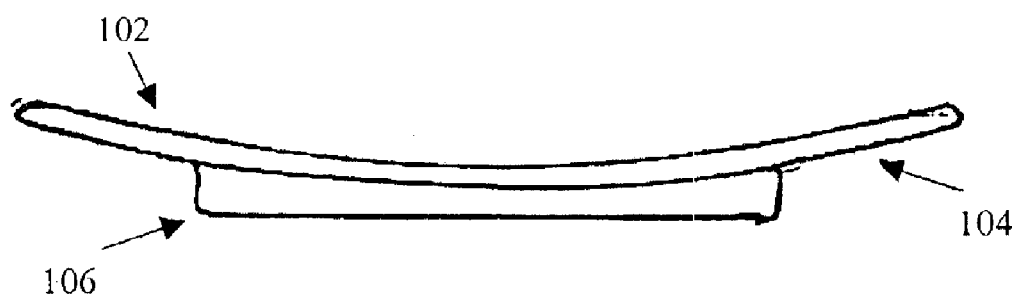

In an alternative embodiment, as shown in FIGS. 9(a) and 9(b), the scale 10, further comprises a weighing tray 100. The weighing tray 100 comprises an upper surface 102 and a lower surface 104, and wherein, the lower surface 104 comprises a flange element 106, which is sized to fit about the weighing platform 20. The upper surface 102 is shaped such that the outer edge of the upper surface 102 is positioned above the scale housing, such that an object having a greater surface area than the weighing platform or loose objects can be weighed.

While there has been shown and described what is considered to be a preferred embodiment of the invention, it will, of course, be understood that various modifications and changes in form or detail could readily be made without departing from the spirit of the invention. It is there fore, intended that the invention be not limited to the exact form and detail herein shown and described, nor to anything less than the whole of the invention herein disclosed.

What is claimed is:

1. A portable, hand held electronic weighing device capable of being transported in a pocket of an article of clothing comprising:

a housing comprising a base and a lid, said base connected to said lid with a hinge, wherein said hinge operates to pivot said lid relative to said base between a closed position covering a weighing platform and an open position exposing said weighing platform, wherein said lid is rearwardly positioned relative to said weighing platform, and wherein said hinge includes damping means to effectuate controlled pivotal motion between said open and closed positions; wherein said housing includes a pair of flanges extending from opposite side edges of said housing in parallel spaced relationship and hinge forming trunnions being formed on inwardly facing surfaces of said flanges; and wherein said hinge comprises a tubular portion formed along one edge of said lid extending between said trunnions, said tubular portion including cylindrical bores extending along the longitudinal axis thereof and said damping means arranged in one of said bores, the damping means comprising a damping drum axially positioned within a spring, a first drum end and a first spring end retained to prevent relative rotation of the first drum end and the first spring end, a second spring end retained to prevent relative rotation of the second spring end with respect to the lid;

a removable tray having an underside fitted to sit on said weighing platform wherein the underside of the removable weighing tray comprises a flanged edge sized to extend around the edge of the weighing platform and an upper surface providing a larger surface area than the weighing platform wherein the upper surface of the weighing tray is cupped for holding the object to be weighed;

weighing circuitry in said base in communication with said platform for weighing objects to provide weight data thereof;

a display located on a front surface of said base for digital display of weight data of said object; and a spring-biased latch mounted in said housing for engaging said lid to maintain said lid in a closed position over said weighing platform, said latch being manually operable to release said lid; the latch comprising a tab receiving aperture formed in said housing, a plate member reciprocally extending into said aperture and held biased by a latch spring for engaging a tab formed in said lid, said tab adapted to extend within said aperture and engage said plate member when said lid is closed, said plate member adapted to be finger-actuated in opposition to a biasing latching force of said latch spring.

\* \* \* \* \*